United States Patent
Aoki et al.

(10) Patent No.: US 8,224,038 B2
(45) Date of Patent: Jul. 17, 2012

(54) APPARATUS, COMPUTER PROGRAM PRODUCT, AND METHOD FOR PROCESSING PICTURES

(75) Inventors: Hisashi Aoki, Kanagawa (JP); Koji Yamamoto, Tokyo (JP); Osamu Yamaguchi, Kanagawa (JP); Kenichi Tabe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1008 days.

(21) Appl. No.: 12/191,027

(22) Filed: Aug. 13, 2008

(65) Prior Publication Data

US 2009/0052746 A1 Feb. 26, 2009

(30) Foreign Application Priority Data

Aug. 21, 2007 (JP) ................................. 2007-215142

(51) Int. Cl.
*G06K 9/00* (2006.01)
(52) U.S. Cl. ........................................ 382/118; 382/190
(58) Field of Classification Search .................. 382/118, 382/190
See application file for complete search history.

(56) References Cited

U.S. PATENT DOCUMENTS

| 5,982,912 | A | 11/1999 | Fukui et al. | |
|---|---|---|---|---|
| 6,252,975 | B1 * | 6/2001 | Bozdagi et al. | 382/107 |
| 6,466,731 | B2 * | 10/2002 | Aoki et al. | 386/241 |
| 6,940,997 | B1 | 9/2005 | Kaneko et al. | |
| 7,003,156 | B1 | 2/2006 | Yamamoto et al. | |
| 2002/0176610 | A1 * | 11/2002 | Okazaki et al. | 382/118 |
| 2003/0090505 | A1 * | 5/2003 | McGee et al. | 345/721 |

FOREIGN PATENT DOCUMENTS

| JP | 9-270006 | 10/1997 |
|---|---|---|
| JP | 2000-285242 | 10/2000 |
| WO | WO 2006/025185 A1 | 3/2006 |

OTHER PUBLICATIONS

Japanese Office Action issued Aug. 23, 2011, in Patent Application No. 2007-215142 (with English-language translation).
U.S. Appl. No. 12/050,558, filed Mar. 18, 2008, Hisashi Aoki, et al.
Takeshi Mita, et al., "Joint Haar-like Features for Face Detection", Proceedings of the Tenth IEEE International Conference on Computer Vision (ICCV'05), 2005, pp. 1-8.
Osamu Yamaguchi, et al., ""Smartface"—A Robust Face Recognition System under Varying Facial Pose and Expression", Journal of IEICE D-II, vol. J84-D-II, No. 6, Jun. 2001, pp. 1045-1052, with English Summary.
Hisashi Aoki, et al., "A Shot Classification Method of Selecting Effective Key-Frames for Video Browsing", Proceedings of ACM Multimedia 96, 1996, pp. 1-10.

* cited by examiner

*Primary Examiner* — Hadi Akhavannik
(74) *Attorney, Agent, or Firm* — Oblon, Spivak, McClelland, Maier & Neustadt, L.L.P.

(57) ABSTRACT

When groups of coordinates of face areas respectively contained in mutually different frames are within a predetermined error range, a face attribute assigning unit assigns mutually the same face attribute value to each of the face areas. In the case where a difference in the feature amounts between the frames is within a predetermined error range, a similar shot detecting unit detects that the shots from which the frames have respectively been extracted are similar shots to each of which mutually the same shot attribute value is assigned. In the case where it is judged that face areas that respectively appear in the frames contained in the similar shots and to which mutually different face attribute values have respectively been assigned represent the face of mutually the same person, the face attribute re-assigning unit assigns mutually the same face attribute value to each of the face areas.

11 Claims, 8 Drawing Sheets

APPARATUS, COMPUTER PROGRAM PRODUCT, AND METHOD FOR PROCESSING PICTURES

CROSS-REFERENCE TO RELATED APPLICATIONS

This application is based upon and claims the benefit of priority from the prior Japanese Patent Application No. 2007-215142, filed on Aug. 21, 2007; the entire contents of which are incorporated herein by reference.

BACKGROUND OF THE INVENTION

1. Field of the Invention

The present invention relates to an apparatus, a computer program product, and a method for processing a picture used for identifying and searching persons appearing in the picture.

2. Description of the Related Art

In recent years, broadcast-program recording apparatuses that are operable to identify persons appearing in the pictures in such a manner that a search can be conducted for the persons have been developed.

In such broadcast-program recording apparatuses, a face area is detected out of each image first. Secondly, the illumination condition and the three-dimensional shape of the images in the detected areas are corrected, before similarities are compared between feature spaces so as to judge whether two face images represent the face of mutually the same person. For example, Osamu YAMAGUCHI et al. "'Smart-Face': A Robust Face Recognition System under Varying Facial Pose and Expression", (Transactions of the Institute of Electronics, Information and Communication Engineers, D-II, Vol. J84-D-II, No. 6, June 2001, pp. 1045-1052) discloses a picture processing apparatus that uses a processing configuration in which a face area detection process is followed by a face feature point detection process, a face area image normalizing process, and an identifying process (i.e., to judge whether two or more face images represent the face of mutually the same person) that is performed by comparing the levels of similarity with reference to a registered face dictionary.

However, when the method in which the feature amounts in the face images are compared with each other is used as described above, it takes time to perform the processes of making corrections before generating the feature amounts and determining the similarities within the feature spaces. Thus, in an environment in which sufficient processing resources are not available, or with a picture that lasts for a long period of time such as recorded contents, a problem arises where the more face images there are to serve as the targets of a classifying process, an attribute assigning process, and an association making process, the more difficult it becomes to perform the processing at a high speed.

SUMMARY OF THE INVENTION

According to one aspect of the present invention, a picture processing apparatus includes a face area detecting unit that detects face areas each of which is an image area presumed to be a person's face, from frames constituting elements of a picture; a face attribute assigning unit that assigns a mutually same face attribute value to each of the face areas, when groups of coordinates of the face areas between the successive frames are within a predetermined error range; a feature amount calculating unit that calculates a feature amount of each of the frames; a cut detecting unit that detects a cut point at which a screen image is switched to another screen image between the temporally successive frames, by using the feature amounts; a similar shot detecting unit that detects shots from which the frames have respectively been extracted as similar shots to each of which a mutually same shot attribute value is assigned, when a difference in the feature amounts between the frames is within a predetermined error range, the shots each being an aggregate of the frames within a time period obtained as a result of dividing at the cut point; and a face attribute re-assigning unit that assigns a mutually same face attribute value to each of the face areas, when the face areas that respectively appear in the frames contained in the similar shots and to which mutually different face attribute values have respectively been assigned are judged to be a face of a mutually same person.

According to another aspect of the present invention, a picture processing method includes detecting face areas each of which is an image area presumed to be a person's face, from frames constituting elements of a picture; assigning a mutually same face attribute value to each of the face areas, when groups of coordinates of the face areas between the successive frames are within a predetermined error range; calculating a feature amount of each of the frames; detecting a cut point at which a screen image is switched to another screen image between the temporally successive frames, by using the feature amounts; detecting shots from which the frames have respectively been extracted as similar shots to each of which a mutually same shot attribute value is assigned, when a difference in the feature amounts between the frames is within a predetermined error range, the shots each being an aggregate of the frames within a time period obtained as a result of dividing at the cut point; and assigning a mutually same face attribute value to each of the face areas, when the face areas that respectively appear in the frames contained in the similar shots and to which mutually different face attribute values have respectively been assigned are judged to be a face of a mutually same person.

A computer program product according to still another aspect of the present invention causes a computer to perform the method according to the present invention.

DETAILED DESCRIPTION OF THE INVENTION

A first embodiment of the present invention will be explained with reference to FIGS. 1 to 9. In the first embodiment, an example in which a personal computer is used as a picture processing apparatus will be explained.

Figure 1:
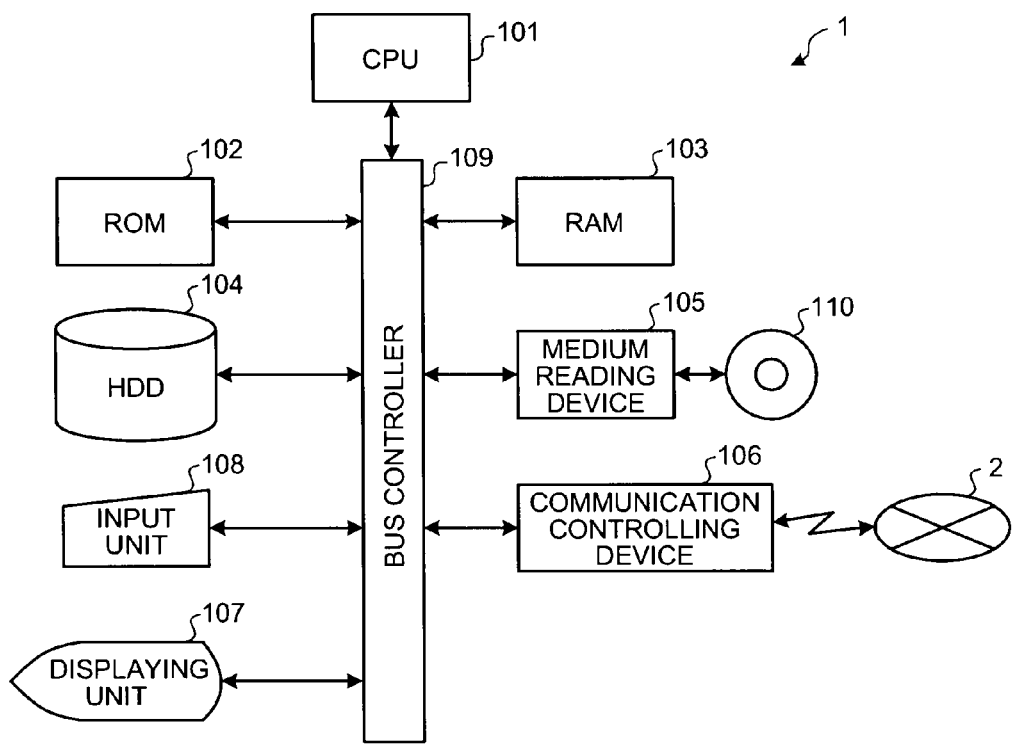
FIG. 1 is a block diagram of a picture processing apparatus according to a first embodiment of the present invention.

FIG. 1 is a block diagram of a picture processing apparatus 1 according to the first embodiment of the present invention. The picture processing apparatus 1 includes: a Central Processing Unit (CPU) 101 that performs information processing; a Read Only Memory (ROM) 102 that stores therein, for example, a Basic Input/Output System (BIOS); a Random Access Memory (RAM) that stores therein various types of data in a rewritable manner; a Hard Disk Drive (HDD) 104 that functions as various types of databases and also stores therein various types of computer programs (hereinafter, "programs", unless stated otherwise); a medium driving device 105 such as a Digital Versatile Disk (DVD) drive used for storing information, distributing information to the outside of the picture processing apparatus 1, and obtaining information from the outside of the picture processing apparatus 1, via a storage medium 110; a communication controlling device 106 that transmits and receives information to and from other computers on the outside of the picture processing apparatus 1 through communication via a network 2; a displaying unit 107 such as a Liquid Crystal Display (LCD) that displays progress and results of processing to an operator of the picture processing apparatus 1; and an input unit 108 that is a keyboard and/or a mouse used by the operator for inputting instructions and information to the CPU 101. The picture processing apparatus 1 operates while a bus controller 109 arbitrates the data transmitted and received among these functional units.

In the picture processing apparatus 1, when the user turns on the electric power, the CPU 101 runs a program that is called a loader and is stored in the ROM 102. A program that is called an Operating System (OS) and that manages hardware and software of the computer is read from the HDD 104 into the RAM 103 so that the OS is activated. The OS runs other programs, reads information, and stores information, according to an operation by the user. Typical examples of an OS that are conventionally known include Windows (registered trademark). Operation programs that run on such an OS are called application programs. Application programs include not only programs that operate on a predetermined OS, but also programs that cause an OS to take over execution of a part of various types of processes described later, as well as programs that are contained in a group of program files that constitute predetermined application software or an OS.

In the picture processing apparatus 1, a picture processing program is stored in the HDD 104, as an application program. In this regard, the HDD 104 functions as a storage medium that stores therein the picture processing program.

Also, generally speaking, the application programs to be installed in the HDD 104 included in the picture processing apparatus 1 can be recorded in one or more storage media 110 including various types of optical disks such as DVDs, various types of magneto optical disks, various types of magnetic disks such as flexible disks, and media that use various methods such as semiconductor memories, so that the operation programs recorded on the storage media 110 can be installed into the HDD 104. Thus, storage media 110 that are portable, like optical information recording media such as DVDs and magnetic media such as Floppy Disks (FDs), can also be each used as a storage medium for storing therein the application programs. Further, it is also acceptable to install the application programs into the HDD 104 after obtaining the application programs from, for example, the external network 2 via the communication controlling device 106.

In the picture processing apparatus 1, when the picture processing program that operates on the OS is run, the CPU 101 performs various types of computation processes and controls the functional units in an integrated manner, according to the picture processing program. Of the various types of computation processes performed by the CPU 101 of the picture processing apparatus 1, characteristic processes according to the first embodiment will be explained below.

Figure 2:
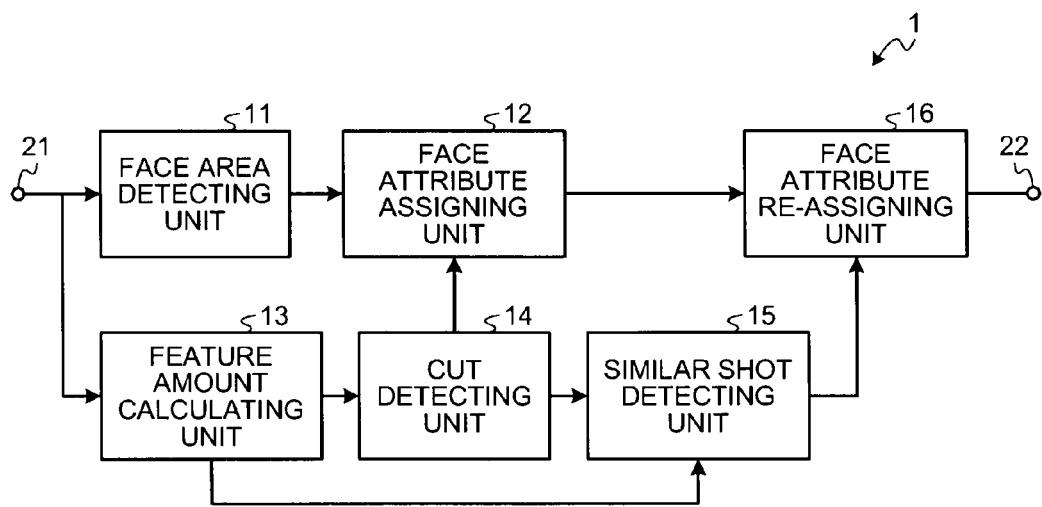
FIG. 2 is a schematic block diagram of the picture processing apparatus.

FIG. 2 is a schematic block diagram of the picture processing apparatus 1. As shown in FIG. 2, by following the picture processing program, the picture processing apparatus 1 includes a face area detecting unit 11, a face attribute assigning unit 12, a feature amount calculating unit 13, a cut detecting unit 14, a similar shot detecting unit 15, and a face attribute re-assigning unit 16. The reference character 21 denotes a picture input terminal, whereas the reference character 22 denotes an attribute information output terminal.

The face area detecting unit 11 detects an image area that is presumed to be a person's face (hereinafter, a "face area") out of a single still image like a photograph or a still image (corresponding to one frame) that is kept in correspondence with a playback time and is a constituent element of a series of moving images, the still image having been input via the picture input terminal 21. To judge whether the still image includes an image area that is presumed to be a person's face and to identify the image, it is possible to use, for example, the method disclosed in MITA et al. "Joint Haar-like Features for Face Detection", (Proceedings of the Tenth Institute of Electrical and Electronics Engineers [IEEE] International Conference on Computer Vision [ICCV '05], 2005). The method for detecting faces is not limited to the one described above. It is acceptable to use any other face detection method.

The face attribute assigning unit 12 tracks the group of coordinates of the face area that has been detected by the face area detecting unit 11 so as to determine whether they are considered to remain the same within a predetermined error range.

Figure 3:
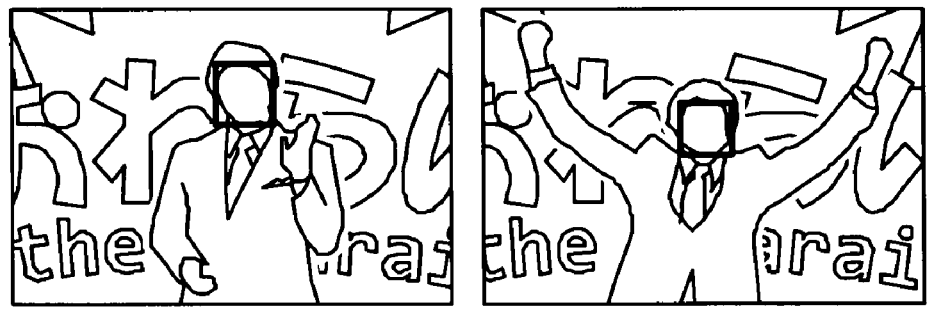
FIG. 3 is a schematic drawing illustrating an example of a face area tracking process.
Figure 3:
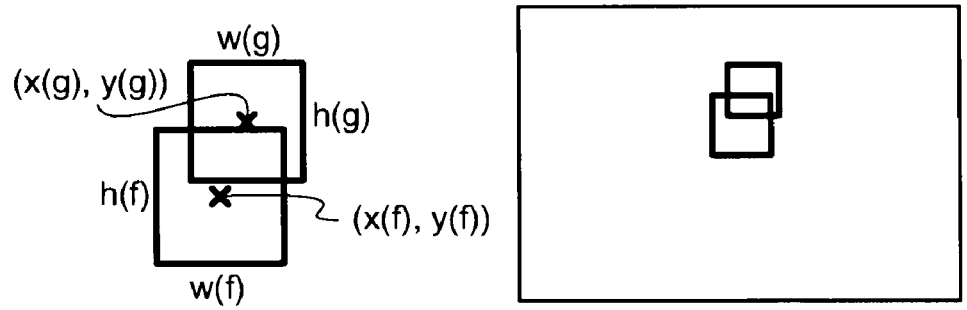

FIG. 3 is a schematic drawing illustrating an example of the face area tracking process. Let us discuss an example in which as many face areas as $N_i$ have been detected from an i'th frame in a series of moving images. In the following explanation, a set of face areas contained in the i'th frame will be referred to as $F_i$. Each of the face areas will be expressed as a rectangular area by using the coordinates of the center point (x, y), the width (w), and the height (h). A group of coordinates for a j'th face area within the i'th frame will be expressed as x(f), y(f), w(f), h(f), where f is an element of the set $F_i$ (i.e., f∈$F_i$). For example, to track the face areas, it is judged whether all of the following three conditions are satisfied: (i) between the two frames, the moving distance of the coordinates of the center point is equal to or smaller than dc; (ii) the change in the width is equal to or smaller than dw; and (iii) the change in the height is equal to or smaller than dh. In this situation, in the case where the following three expressions are satisfied, the face area f and the face area g are presumed to represent the face of mutually the same person: (i) $(x(f)-x(g))^2+(y(f)-y(g))^2=dc^2$; (ii) $|w(f)-w(g)|=dw$; (iii) $|h(f)-h(g)|=dh$. In the expressions above, "| |" is the absolute value symbol. The calculations described above are performed on all of the face areas f that satisfy "$f \epsilon F_i$" and all of the face areas g that satisfy "$g \epsilon F_j$".

Figure 4:
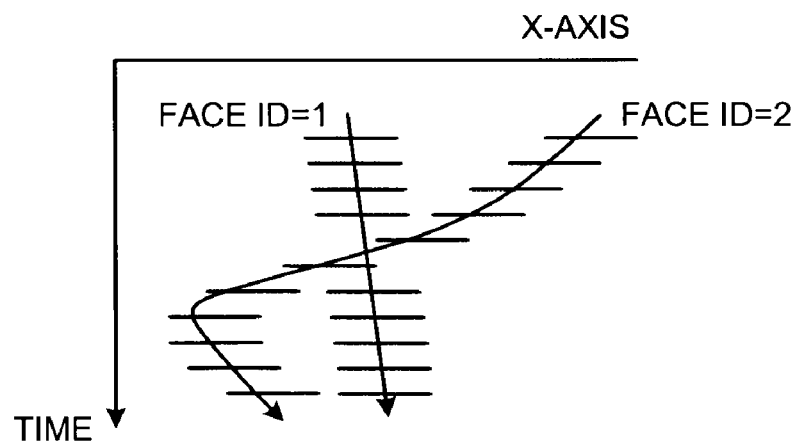
FIG. 4 is a schematic drawing illustrating another example of the face area tracking process in which a situation where "someone else cuts across in front of the camera" is taken into consideration.

The method for tracking the face areas is not limited to the one described above. It is acceptable to use any other face area tracking methods. For example, in a situation where another person cuts across in front of the camera between the person being in the image and the camera, there is a possibility that the face area tracking method described above may result in an erroneous detection. To solve this problem, another arrangement is acceptable in which, as shown in FIG. 4, the tendency in the movements of each face area is predicted, based on the information of the frames that precede the tracking target frame by two frames or more, so that it is possible to track the face areas while the situation where "someone else cuts in front of the camera" (called "occlusion") is taken into consideration.

In the face area tracking method described above, rectangular areas are used as the face areas; however, it is acceptable to use areas each having a shape such as a polygon or an oval.

Subsequently, in the case where a pair of face areas that are presumed to represent the face of mutually the same person have been detected out of the two frames as described above, the face attribute assigning unit 12 assigns mutually the same face attribute value (i.e., an identifier [ID]) to each of the pair of face areas.

The feature amount calculating unit 13 calculates a feature amount of each of the frames, without performing any process to comprehend the structure of the contents (e.g., without performing a face detection process or an object detection process), out of the single still image like a photograph or the still image (corresponding to one frame) that is kept in correspondence with a playback time and is a constituent element of the series of moving images, the still image having been input via the picture input terminal 21. The calculated feature amount of each of the frames is used in a cut detection process performed by the cut detecting unit 14 and a similar shot detecting process performed by the similar shot detecting unit 15 in the following steps. Examples of the feature amount of each of the frames include: an average value of the luminance levels or the colors of the pixels contained in the frame, a histogram thereof, and an optical flow (i.e., a motion vector) in the entire screen area or in a sub-area that is obtained by mechanically dividing the screen area into sections.

By using the feature amounts of the frames that have been calculated by the feature amount calculating unit 13, the cut detecting unit 14 performs the cut detection process to detect a point at which one or more frames have changed drastically among the plurality of frames that are in sequence. The cut detection process denotes a process of detecting whether a switching operation has been performed on the camera between any two frames that are in a temporal sequence. The cut detection process is sometimes referred to as a "scene change detection process". With regard to television broadcast, a "cut" denotes: a point in time at which the camera that is taking the images to be broadcast on a broadcast wave is switched to another camera; a point in time at which the camera is switched to other pictures that were recorded beforehand; or a point in time at which two mutually different series of pictures that were recorded beforehand are temporally joined together through an editing process. Also, with regard to artificial picture creation processes that use, for example, Computer Graphics (CG) or animations, a point in time at which one image is switched to another is referred to as a "cut", when the switching reflects an intention of the creator that is similar to the one in the picture creation processes that use natural images as described above. In the description of the first embodiment, a point in time at which an image on the screen is changed to another will be referred to as a "cut" or a "cut point". One or more pictures in each period of time that is obtained as a result of dividing at a cut will be referred to as a "shot".

Various methods for detecting a cut have been proposed. For example, it is possible to use the method that is disclosed in NAGASAKA et al. "Automatic scene-change detection method for video works", (Proceedings of the 40th National Convention of Information Processing Society of Japan, pp. 642-643, 1990). The method for detecting a cut is not limited to the one described above. It is acceptable to use any other cut detection method.

The cut point that has been detected by the cut detecting unit 14 as described above is forwarded to the face attribute assigning unit 12. The shots that have been obtained as a result of the temporal division performed by the cut detecting unit 14 are forwarded to the similar shot detecting unit 15.

In the case where the cut point that has been forwarded from the cut detecting unit 14 is positioned between the two frames serving as the tracking targets, the face attribute assigning unit 12 ends the face area tracking process described above. In other words, the face attribute assigning unit 12 judges that the two frames contain no pair of face areas to which mutually the same attribute value should be assigned.

The similar shot detecting unit 15 detects similar shots among the shots that have been obtained as a result of the temporal division and forwarded from the cut detecting unit 14. In this situation, each of the "shots" corresponds to a unit of time period that is shorter than a "situation" or a "scene" such as "a police detective is running down a criminal to a warehouse at a port" or "quiz show contestants are thinking of an answer to Question 1 during the allotted time". In other words, a "situation", a "scene", or a "segment (of a show)" is made up of a plurality of shots. In contrast, shots that have been taken by using mutually the same camera are pictures that are similar to each other on the screen even if they are temporally apart from each other, as long as the position of the camera, the degree of the zoom (i.e., close-up), or the "camera angle" like the direction in which the camera is pointed does not drastically change. In the description of the first embodiment, these pictures that are similar to each other will be referred to as "similar shots". Also, with regard to the artificial picture creation processes that use, for example, CG or animations, the shots that have been synthesized as if the images of a rendered object were taken from mutually the same direction while reflecting a similar intention of the creator can be referred to as "similar shots".

Next, the method for detecting the similar shots that is used by the similar shot detecting unit 15 will be explained in detail. In the similar shot detection process, the feature amounts that are the same as the ones used in the cut detection process performed by the cut detecting unit 14 are used. One or more frames are taken out of each of two shots that are to be compared with each other so that the feature amounts are compared between the frames. In the case where the difference in the feature amounts between the frames is within a predetermined range, the two shots from which the frames have respectively been extracted are judged to be similar shots. When a moving image encoding method such as the Moving Picture Experts Group (MPEG) is used, and in the case where an encoding process is performed by using mutually the same encoder on two shots that are mutually the same or that are extremely similar to each other, there is a possibility that two sets of encoded data that are mutually the same or have a high level of similarity may be stored. In that situation, it is acceptable to detect similar shots by comparing the two sets of encoded data with each other, without decoding the encoded data.

To detect the similar shots, for example, it is possible to use the method disclosed in JP-A H09-270006 (KOKAI). The method for detecting the similar shots is not limited to the one described above. It is acceptable to use any other similar shot detecting method.

After the face area detecting unit 11 and the face attribute assigning unit 12 have completed the face area detection process and the face area tracking process, respectively, on all the frames in the series of moving images, and the similar shot detecting unit 15 has completed the similar shot detection process on all the shots, the face attribute re-assigning unit 16 judges whether the face areas that are included in two mutually different shots and to which mutually different face attribute values have been assigned should be determined as representations of the face of mutually the same person. "Two mutually different shots" are a pair of individual shots that have been obtained as result of the temporal division from the cut detecting unit 14, regardless of those similarities between each other. This process is performed for the following reasons: The face attribute assigning unit 12 judges whether two face areas represent the face of mutually the same person, only based on whether the face areas in a temporal sequence have coordinates that are close to each other. Thus, the face attribute assigning unit 12 does not perform the face area tracking process on two or more face areas that are respectively contained in the frames that are temporally apart from one another within a series of moving images. As a result, even if the two or more face areas actually represent the face image of mutually the same person, it is not possible to assign mutually the same face attribute value to those face areas through the processes that have been performed so far.

Figure 5:
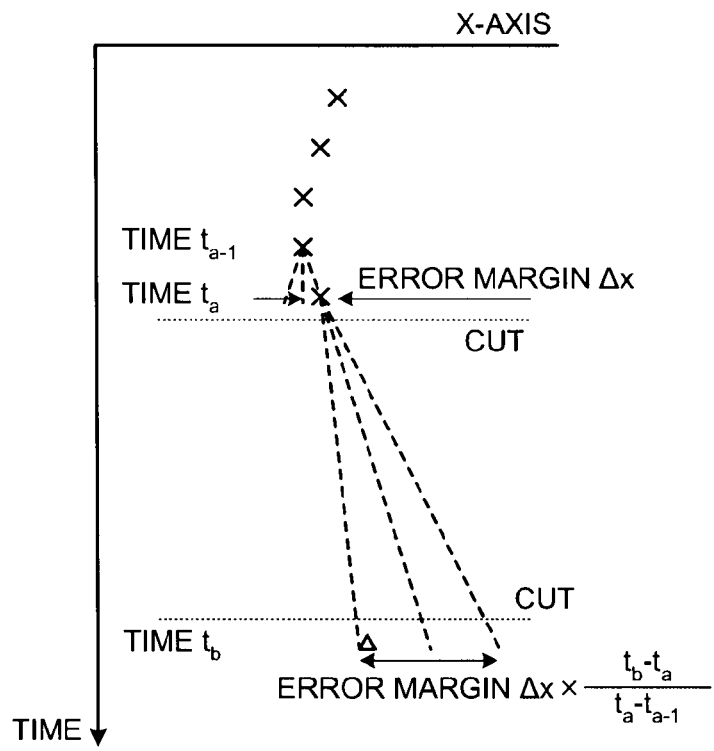
FIG. 5 is a schematic drawing illustrating a method for detecting face areas.

A method for detecting face areas that is used by the face attribute re-assigning unit 16 will be explained, with reference to FIGS. 5 and 6. The method for detecting face areas that is used by the face attribute re-assigning unit 16 may be the same as the one used by the face attribute assigning unit 12 explained above. As shown in FIG. 5, with regard to two frames that are in a temporal sequence, it is assumed that a condition under which the face areas are determined to represent the face of mutually the same person, i.e., a condition under which a face area detection result (indicated with a "cross") in a first frame at a time $t_{a-1}$ is positioned close to a face area detection result (indicated with another "cross") in a second frame at a time $t_a$ is defined as whether the center point of the face area at the time $t_a$ is positioned within an area having a radius of $\Delta x$ and being centered around the center point $x_{a-1}$ of the face area at the time $t_{a-1}$, where x denotes a vector in the x-y coordinates. Based on this assumption, to determine whether a face area (indicated with a "triangle") within a frame at a time $t_b$ contained in a shot that is a similar shot of and is temporally away from the shot containing the frames at the times $t_{a-1}$ and $t_a$ represents the face of the same person as the face areas indicated with the "crosses", it is possible to use, as a judgment condition, whether the face area indicated with the "triangle" is positioned within an area having a radius of $k\Delta x$ and being centered around a point expressed as $x_a+k(x_a-x_{a-1})$, where the coefficient k satisfies $k=(t_b-t_a)/(t_a-t_{a-1})$.

Figure 6:
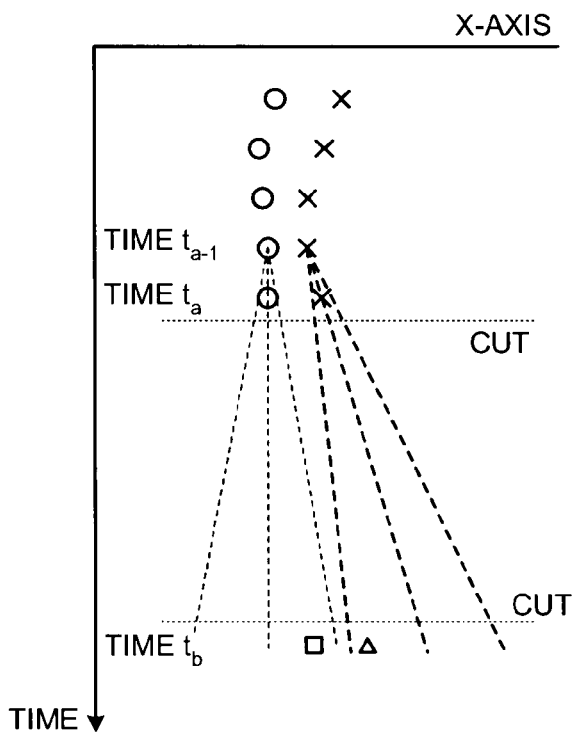
FIG. 6 is another schematic drawing illustrating the method for detecting face areas.

FIG. 6 is a drawing illustrating an example of the face area tracking process that is performed when a plurality of face areas have been detected. As shown in FIG. 6, let us discuss an example in which two face areas respectively indicated with a "circle" and a "cross" have been detected in a first one of two similar shots, whereas two face areas respectively indicated with a "triangle" and a "square" have been detected at the beginning of a second one of the similar shots that follows the first one. An example of a method for bringing the face areas in correspondence with one another will be explained. In the same manner as described above, to track the face area indicated with the "cross", the center point expressed as $x_a+k(x_a-x_{a-1})$ at the time $t_b$ is calculated. In this situation, a normal distribution having a half width of $k\Delta x$ and being centered around the center point $x_a+k(x_a-x_{a-1})$ is specified as a probability distribution. It is possible to define $\Delta x$ in the same manner as described above. When a value of the probability distribution with respect to the face area indicated with the "triangle" is calculated, the value calculated with the face area indicated with the "cross" is larger than the value calculated with the face area indicated with the "circle". Consequently, it is possible to presume that the face area indicated with the "triangle" represents the face of the same person as the face area indicated with the "cross". The same applies to the relationship between the face area indicated with the "circle" and the face area indicated with the "square".

As explained above, according to the first embodiment, in the case where it is understood in advance that two shots are similar shots, by multiplying the threshold value ($\Delta x$ in the example above) obtained as a result of the face area tracking process in units of frames by the temporal distance between the first and the second similar shots, it is possible to perform a matching process on the frames that are temporally apart from each other, in other words, on the face areas that are contained in the mutually different shots.

When the groups of coordinates of the face areas are compared with each other, there is a possibility that, during the course of time, a group of coordinates of a face area having one attribute may change (i.e., move) within one shot. In this situation, an arrangement is acceptable in which an average value of the coordinates within the shot is used. Alternatively, another arrangement is also acceptable in which groups of coordinates at the beginning, the middle, and the end of a shot or a period of time during which the face area appears are used. Further, yet another arrangement is acceptable in which, for all the groups of coordinates of a face area having one attribute that exhibit a temporal change (i.e., a temporal movement), the change is calculated between the two face areas being compared with each other.

Next, a procedure in a face attribute assigning process that is performed by the CPU 101 of the picture processing apparatus 1 will be explained, with reference to the flowchart in FIG. 7.

Figure 7:
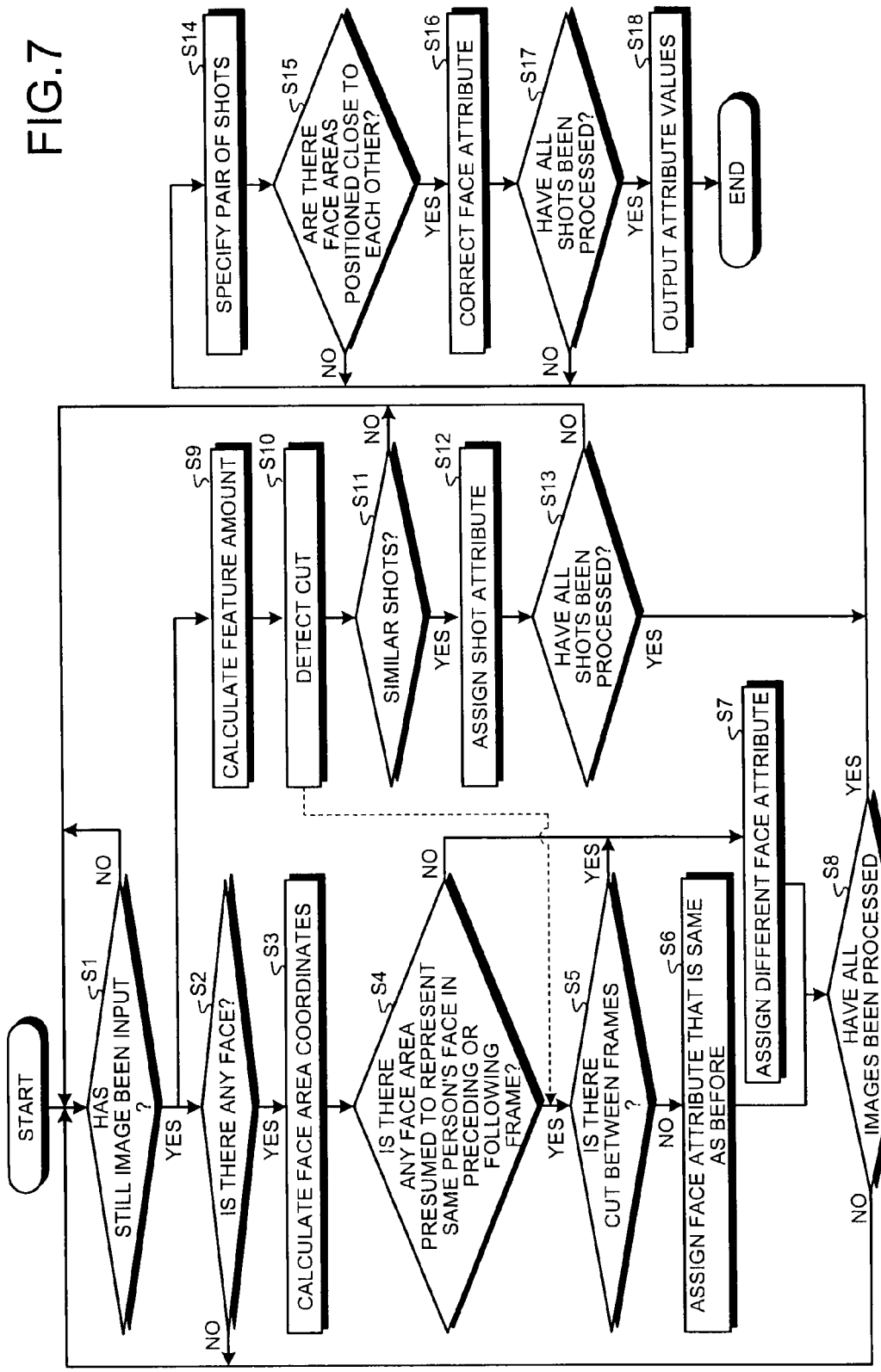
FIG. 7 is a flowchart of a procedure in a face attribute assigning process.

As shown in FIG. 7, when a single still image like a photograph or a still image (corresponding to one frame) that is kept in correspondence with a playback time and is a constituent element of a series of moving images has been input to the picture input terminal 21 (step S1: Yes), the input still image is forwarded to the face area detecting unit 11 so that the face area detecting unit 11 judges whether the input still image contains any image area that is presumed to be a person's face (step S2). In the case where the face area detecting unit 11 has judged that the still image contains at least one image area that is presumed to be a person's face (step S2: Yes), the face area detecting unit 11 calculates a group of coordinates of the face area (step S3). On the other hand, in the case where the face area detecting unit 11 has judged that the still image contains no image area that is presumed to be a person's face (step S2: No), the process returns to step S1, and the CPU 101 waits until the next still image is input.

In the case where the input still image serving as the detection target contains at least one face area, and also the input still image is a constituent element (i.e., one frame) of a series of moving images, the face attribute assigning unit 12 performs a tracking process by judging whether groups of coordinates of the face areas that are extracted by the face area detecting unit 11 from the target frame and the frames that precede and follow the target frame are within a predetermined error range and are considered to be the same (step S4).

In the case where the face attribute assigning unit 12 has detected a pair of face areas that are presumed to represent the face of mutually the same person from among the target frame and the frames that precede and follow the target frame (step S4: Yes), and also a cut point that has been forwarded from the cut detecting unit 14 (see step S10 described below) is not positioned between the two frames serving as the face area tracking targets (step S5: No), the face attribute assigning unit 12 assigns mutually the same face attribute value (i.e., an ID) to each of the pair of face areas (step S6).

On the other hand, in the case where the face attribute assigning unit 12 has detected no pair of face areas that are presumed to represent the face of mutually the same person from among the target frame and the frames that precede and follow the target frame (step S4: No), or in the case where, although the face attribute assigning unit 12 has detected a pair of face areas that are presumed to represent the face of mutually the same person from among the target frame and the frames that precede and follow the target frame (step S4: Yes), the cut point that has been forwarded from the cut detecting unit 14 is positioned between the two frames serving as the face area tracking targets (step S5: Yes), the face area tracking process is ended. The face attribute assigning unit 12 judges that the two frames contain no pair of face areas to which mutually the same attribute value should be assigned. As a result, the face attribute assigning unit 12 assigns mutually different face attribute values (i.e., IDs) to the face areas, respectively (step S7).

Figure 8:
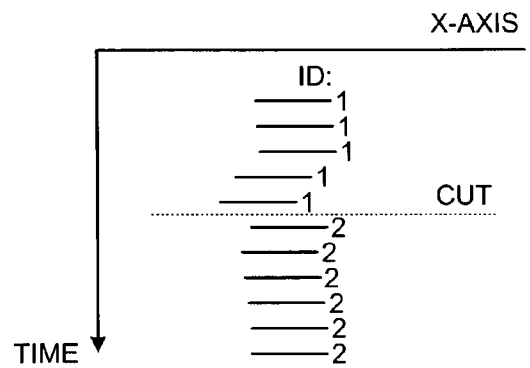
FIG. 8 is a schematic drawing illustrating an example in which face attribute values are assigned.

FIG. 8 is a drawing illustrating an example in which face attribute values (i.e., IDs) are assigned to face areas in the case where a cut point is positioned between two frames serving as the face area tracking targets. In FIG. 8, it is observed that the face attribute value (i.e., the ID) changes at the cut point that has been forwarded from the cut detecting unit 14.

The processes at steps S2 through S7 that have been explained above are repeatedly performed until the processes are completed on each of all the images (i.e., all the frames in the series of moving images) (step S8: Yes).

When the still image (corresponding to one frame) has been input to the picture input terminal 21 (step S1: Yes), the input still image is also forwarded to the feature amount calculating unit 13. The feature amount calculating unit 13 calculates, from the entire image, a feature amount that is used in the cut detection process and the similar shot detection process that are explained below, without performing any process to comprehend the structure of the contents (i.e., without performing a face detection process or an object detection process) (step S9). Subsequently, the cut detecting unit 14 performs a cut detection process by using the feature amount of the frame that has been calculated by the feature amount calculating unit 13 (step S10).

After that, the similar shot detecting unit 15 detects similar shots from among the shots that are obtained as a result of the temporal division performed by the cut detecting unit 14 (step S11). In the case where two similar shots have been detected (step S11: Yes), the similar shot detecting unit 15 assigns mutually the same shot attribute value (i.e., an ID) to each of the two shots that have been judged to be similar shots (step S12). On the other hand, in the case where the similar shot detecting unit 15 has detected no similar shots (step S1: No), the process returns to step S1, and the CPU 101 waits until the next still image is input.

The processes at steps S9 through S12 that have been explained above are repeatedly performed until the processes are completed on each of all the images (i.e., all the frames in the series of moving images) (step S13: Yes).

As a result of the processes described above, with regard to the person's face appearing in the picture, mutually the same face attribute value is assigned to the groups of coordinates of the face areas that have mutually the same attribute throughout the plurality of frames, based on the temporal sequence in which the face images appear. With regard to the picture itself, if there are any similar shots among the shots that are obtained as a result of the dividing in the cut detection process, mutually the same shot attribute is assigned to each of the similar shots.

After that, the face attribute re-assigning unit 16 judges whether the face areas that are contained in mutually different shots and to which mutually different face attribute values have been assigned should be determined as representations of the face of mutually the same person. More specifically, the face attribute re-assigning unit 16 specifies a pair of shots that are made up of two predetermined shots, that is, a pair of shots that are made up of two similar shots, according to the first embodiment (step S14). The face attribute re-assigning unit 16 then compares the groups of coordinates of the face areas that are respectively contained in the two similar shots and judges whether the two similar shots respectively contain face areas that are located in positions similar to each other and that have a similar size to each other (step S15).

In the case where the face attribute re-assigning unit 16 has judged that at least one of the two similar shots being compared contains no face area or that the two similar shots being compared do not respectively contain face areas that are located in positions similar to each other and that have a similar size to each other (step S15: No), the process returns to step S14 so that the next pair of shots that are made up of two similar shots can be specified.

Figure 9:
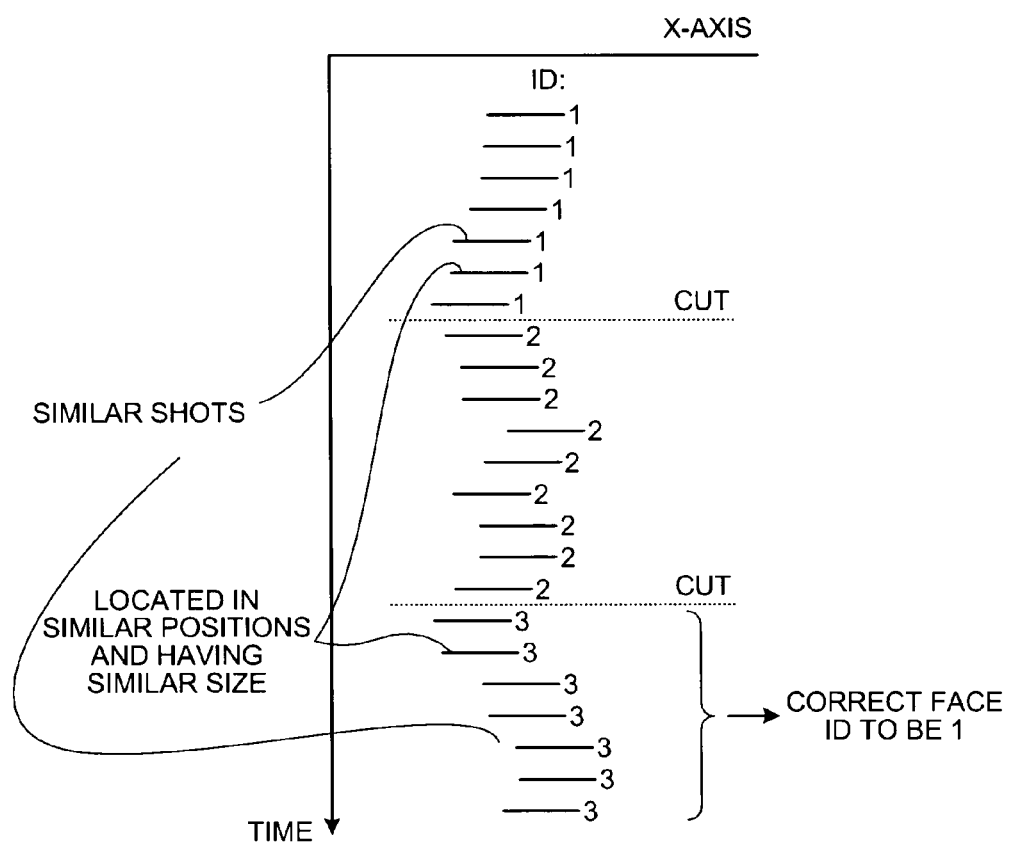
FIG. 9 is a schematic drawing illustrating an example in which the face attribute values are corrected.

On the other hand, in the case where the face attribute re-assigning unit 16 has judged that the two similar shots being compared respectively contain face areas that are located in positions similar to each other and that have a similar size to each other (step S15: Yes), the face attribute re-assigning unit 16 corrects the mutually different face attribute values that have respectively been assigned to the face areas so as to be mutually the same face attribute value (step S16). In FIG. 9, an example in which the face attribute values are corrected is shown.

The processes at steps S14 through S16 that have been explained above are repeatedly performed until the processes are completed on all the similar shots contained in the entire picture (step S17: Yes).

The CPU 101 outputs the attribute values that have been put together and corrected in correspondence with the face areas as described above, through the attribute information output terminal 22 (step S18).

The information that is dealt with by the face area detecting unit 11, the face attribute assigning unit 12, the feature amount calculating unit 13, the cut detecting unit 14, the similar shot detecting unit 15, and the face attribute re-assigning unit 16 is stored and exchanged by using a primary storage device such as the RAM 103 and/or the HDD 104. Examples of such information include: an input from a preceding process that needs to be temporarily stored in these units; an output that needs to be forwarded from these units to a following process; information of processes that have already been performed and information about the progress of a process that is currently being performed that need to be stored for the purpose of performing data processing retroactively.

As explained above, according to the first embodiment, in the case where the groups of coordinates of the face areas that are respectively contained in the mutually different frames are within the predetermined error range, mutually the same face attribute value is assigned to each of the face areas. In the case where the difference in the feature amounts between the frames is within the predetermined error range, the shots from which these frames have respectively been extracted are detected as similar shots to each of which mutually the same shot attribute value is assigned. In the case where it has been judged that the face areas that respectively appear in the frames contained in two similar shots and to which mutually different face attribute values have respectively been assigned represent the face of mutually the same person, mutually the same face attribute value is assigned to each of the face areas. With these arrangements, without having to perform a high-level recognition process such as a feature point detection process and a normalization process that are related to the contents of the face image as well as a dictionary creating process and a comparing process with the dictionary, it is possible to effectively combine the face area detection process corresponding to a pre-processing portion of the face recognition process with the similar shot detection process that is restrictive and involves a high-speed and small-volume calculation. Thus, it is possible to sort out the faces contained in the picture at a high-speed and in a small-volume manner. Consequently, it is possible to provide a result of the face identification process at a higher speed than according to the conventional technique and with a constant level of precision.

In the description of the first embodiment, the example is explained in which, after the face area detection process and the face area tracking process are completed on each of all the frames within the series of moving images, and also, after the similar shot detection process is completed on all the shots, the attribute re-assigning process is performed on the face areas, starting with the first shot, again, in the series of moving images. However, the present invention is not limited to this example. For example, another arrangement is acceptable in which the images that have been input and the results of the processes are stored in a constant buffer, so that "the face area detection and face area tracking process", "the cut detection and similar shot detection process", and "the face attribute re-assigning process using the results of these processes" are sequentially performed on the images that have been input. In this situation, it is possible to complete the entire processes related to the series of moving images as soon as or very shortly after the process of inputting the images has been completed.

As a modification example of the first embodiment, another arrangement is acceptable in which the cut detection process and the face area tracking process are not performed. In this situation, it is possible to realize the processes explained above in the same manner on an assumption that "the entire series of moving images is made up of shots each of which contains one frame".

Further, as another modification example of the first embodiment, the present invention may be applied to a situation in which the input pictures are not part of a series of moving images and are not necessarily in a temporal sequence, e.g., photographs. In this situation also, it is possible to realize the processes in the same manner as in the example where "the cut detection process and the face area tracking process are not performed", on an assumption that each of the photographs corresponds to one shot. For example, to judge whether two face images that are respectively shown in two photographs represent the face of mutually the same person, in the case where the feature amounts that have respectively been extracted from the two entire images are similar to each other (which corresponds to the case where the shots are similar shots), the groups of coordinates of the face areas that are respectively contained in the images are compared with each other. If there is a pair of face areas of which the groups of coordinates are positioned close to each other, mutually the same face attribute value is assigned to each of the face areas. In other words, it is presumed that these face areas represent the face of mutually the same person. This technique may be applied to a situation in which a plurality of ceremonial photographs are taken in series, with the anticipation that the photographed person's facial expression may not be satisfactory in some of the photographs. By using this technique, it is possible to bring the face images in the photographs into correspondence with one another.

Next, a second embodiment of the present invention will be explained, with reference to FIGS. 10 to 14. Some of the configurations that are the same as those explained in the first embodiment will be referred to by using the same reference characters, and the explanation thereof will be omitted.

In the second embodiment, the method for detecting similar shots is different from the method according to the first embodiment.

Figure 10:
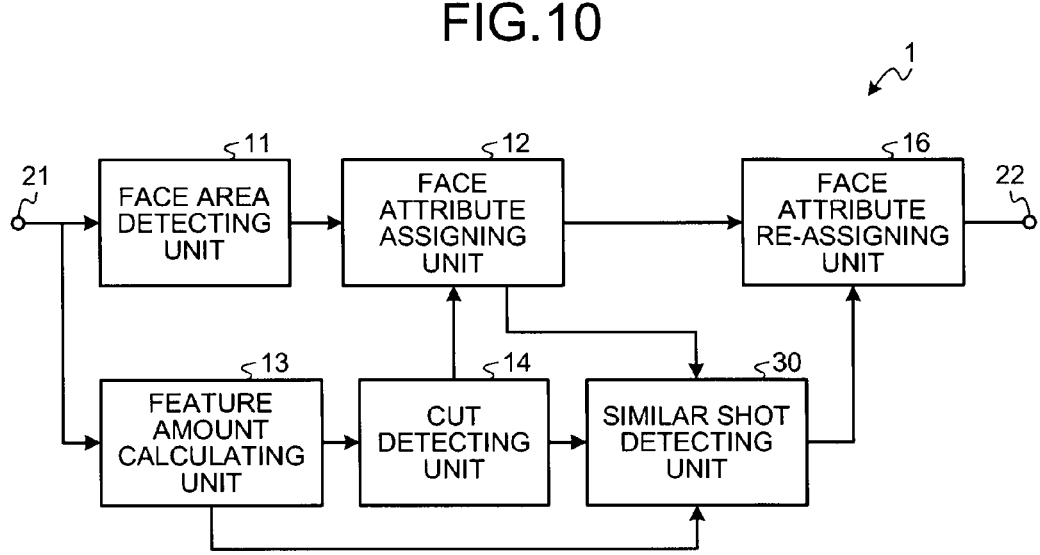
FIG. 10 is a schematic block diagram of a picture processing apparatus according to a second embodiment of the present invention.

FIG. 10 is a schematic block diagram of the picture processing apparatus 1 according to the second embodiment of the present invention. As shown in FIG. 10, by following the picture processing program, the picture processing apparatus 1 includes the face area detecting unit 11, the face attribute assigning unit 12, the feature amount calculating unit 13, the cut detecting unit 14, a similar shot detecting unit 30, and the face attribute re-assigning unit 16. The reference character 21 denotes the picture input terminal, whereas the reference character 22 denotes the attribute information output terminal.

The similar shot detecting unit 30 according to the second embodiment is different from the first embodiment in that a similar shot detection process is performed by combining a result of the face area detection process with a result of the cut detection process. Also, the second embodiment is different from the first embodiment in that the similar shot detecting unit 30 does not use the feature amounts of the frames that are calculated by the feature amount calculating unit 13.

Figure 11:
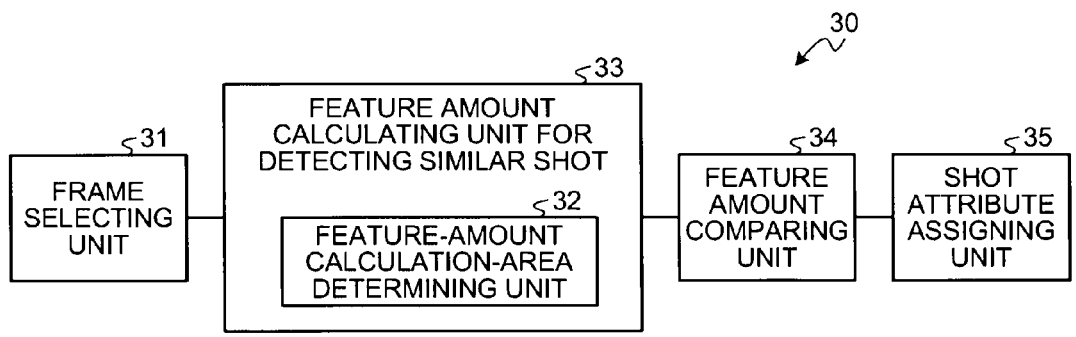
FIG. 11 is a functional block diagram of a similar shot detecting unit.

FIG. 11 is a functional block diagram of the similar shot detecting unit 30. As shown in FIG. 11, the similar shot detecting unit 30 includes a frame selecting unit 31, a feature amount calculating unit 33 for detecting similar shot, a feature amount comparing unit 34, and a shot attribute assigning unit 35. Further, the feature amount calculating unit 33 includes a feature-amount calculation-area determining unit 32.

The frame selecting unit 31 selects one or more still images out of each of two shots that are subject to a similarity judgment process to judge whether they are similar shots. In this situation, the one or more still images may be selected from arbitrary positions of each of the shots, such as the beginning, the middle, and the end of each of the shots. Alternatively, it is acceptable to select a number of still images from the beginning and a number of still images from the end of each of the shots.

Based on the face areas that are obtained as the results of the face area detection process and the face area tracking process that have been performed on each of all the frames within a series of moving images by the face area detecting unit 11 and the face attribute assigning unit 12, respectively, the feature-amount calculation-area determining unit 32 determines a feature amount calculation area within each frame that is to be used by the feature amount calculating unit 33 in the following step.

Next, the method for determining the area that is to be used for calculating the feature amount within each of the frames will be explained in detail.

Figure 12:
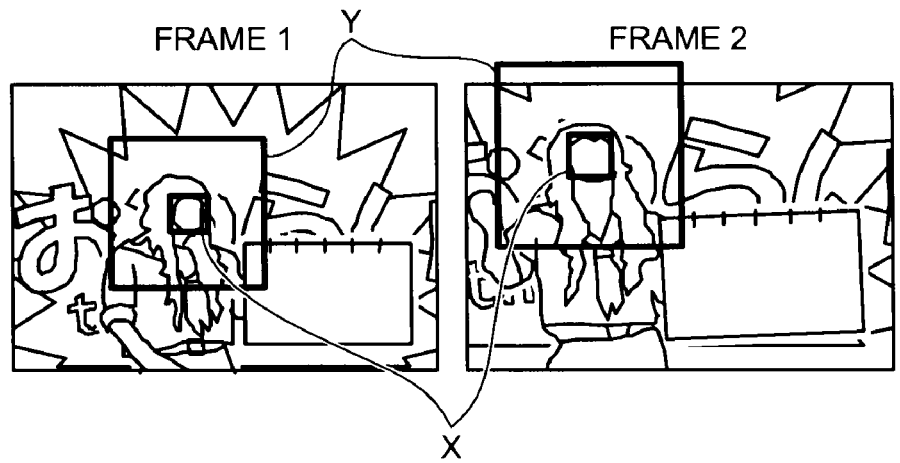
FIG. 12 is a schematic drawing illustrating an example of a method for determining a feature amount calculation area.

For example, as shown in FIG. 12, in the case where a face area X has been detected out of each of the two frames serving as targets of the similarity judgment process, it is assumed that an enlarged area that is obtained by applying a predetermined calculation to the group of coordinates of each of the face areas X is a feature amount calculation areas Y. In this situation, for example, each of the feature amount calculation areas Y may be an area of which the coordinates of the center point is the same as the coordinates of the center point of the corresponding one of the face areas X, and of which the width and the height are obtained by multiplying those of the corresponding one the face areas X by a predetermined constant. According to this method, as shown in FIG. 12, when the camera has zoomed in or out (assuming that the same camera is used for both of the images), it is possible to reduce the risk of mistakenly judging that those two shots are not similar shots for the reason that the pixels in the perimeter of the images are excluded from the image feature amounts of the entire images. Consequently, an advantageous effect is achieved where it is possible to improve the level of precision in the similar shot detection process.

Figure 13:
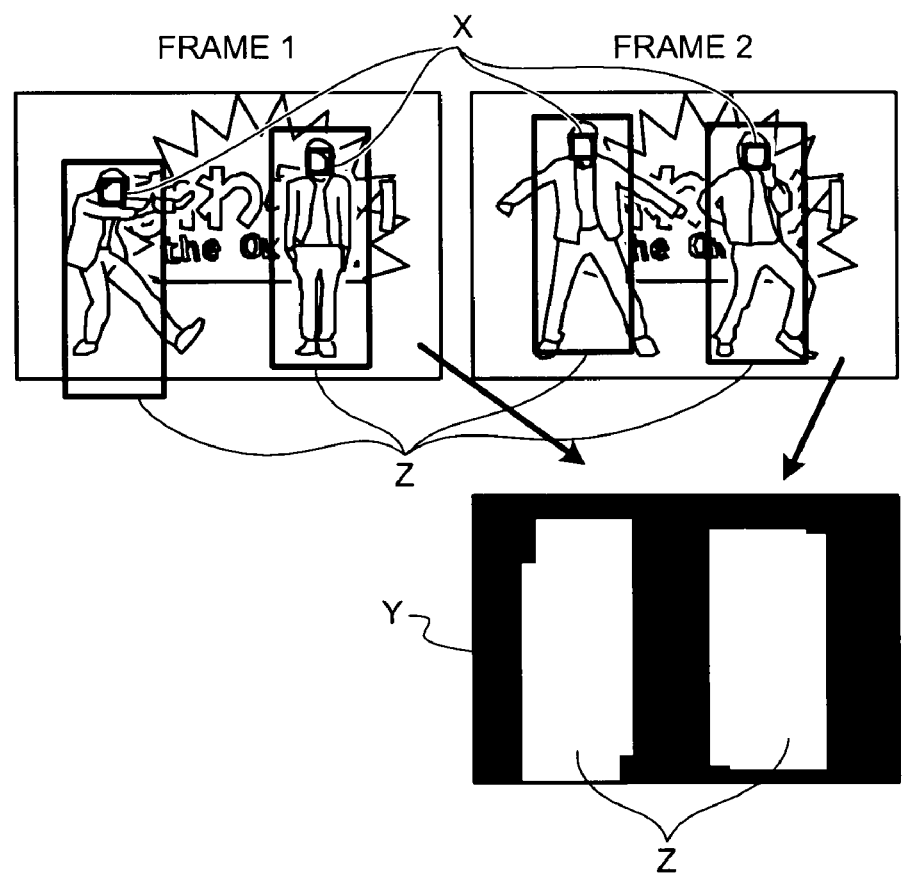
FIG. 13 is a schematic drawing illustrating another example of the method for determining a feature amount calculation area.

As another example, as shown in FIG. 13, in the case where face areas X have been detected out of each of the two frames serving as targets of the similarity judgment process, it is assumed that each of combined areas Z is obtained by combining (i.e., adding together) two enlarged areas (i.e., person areas) each of which is obtained by applying a predetermined calculation to the group of coordinates of the corresponding one of the face areas X. Also, it is assumed that an area that is obtained by excluding the combined areas Z from the frame is a feature amount calculation area Y. In this situation, for example, each of the enlarged areas may be an area of which the position of the center point is obtained by lowering the center point of the corresponding one of the face areas X in the height direction of the image, by a distance obtained by multiplying the height of the face area by a predetermined constant, and of which the width and the height are obtained by multiplying those of the corresponding one of the face areas X by a predetermined constant. The feature amount calculation area Y may be an area that remains after the combined areas Z each of which is obtained by combining the enlarged areas together are excluded from the area serving as the target of the feature amount calculation process. In this situation, each of the combined areas Z corresponds to an area in which the image of the person is rendered in an average manner, based on the position and the size of the face. According to this method as shown in FIG. 13, even in the case where the camera angle has not been changed at all, but the person in the image has moved a lot in such a manner that the background that has been hidden behind the person is now displayed or the background that has been displayed is no longer displayed, it is possible to reduce the risk of mistakenly judging that those two shots are not similar shots on account of the image feature amounts created by the pixels in the newly-displayed background or the newly-hidden background. Consequently, an advantageous effect is achieved where it is possible to improve the level of precision in the similar shot detection process.

As yet another example, in the case where a face area has been detected in each of the two frames that are serving as targets of the similarity judging process, it is acceptable to use the group of coordinates themselves of each of the face areas X as a part or all of the feature amount calculated by the feature amount calculating unit 33. (In this situation, the feature amount calculation area determining unit 32 does not have to operate.) For example, in the case where only one face area is contained in each of the frames, it is acceptable to use a method in which the group of coordinates of each face area (x, y, w, h) as explained in the first embodiment is added to feature vectors in such a manner that the dimensionality of the feature vectors increases, the feature vectors being generated from the components of a hue histogram calculated from the entire frame. (For the method for calculating the hue histogram, see, for example, JP-A H09-270006 (KOKAI)).

Figure 14:
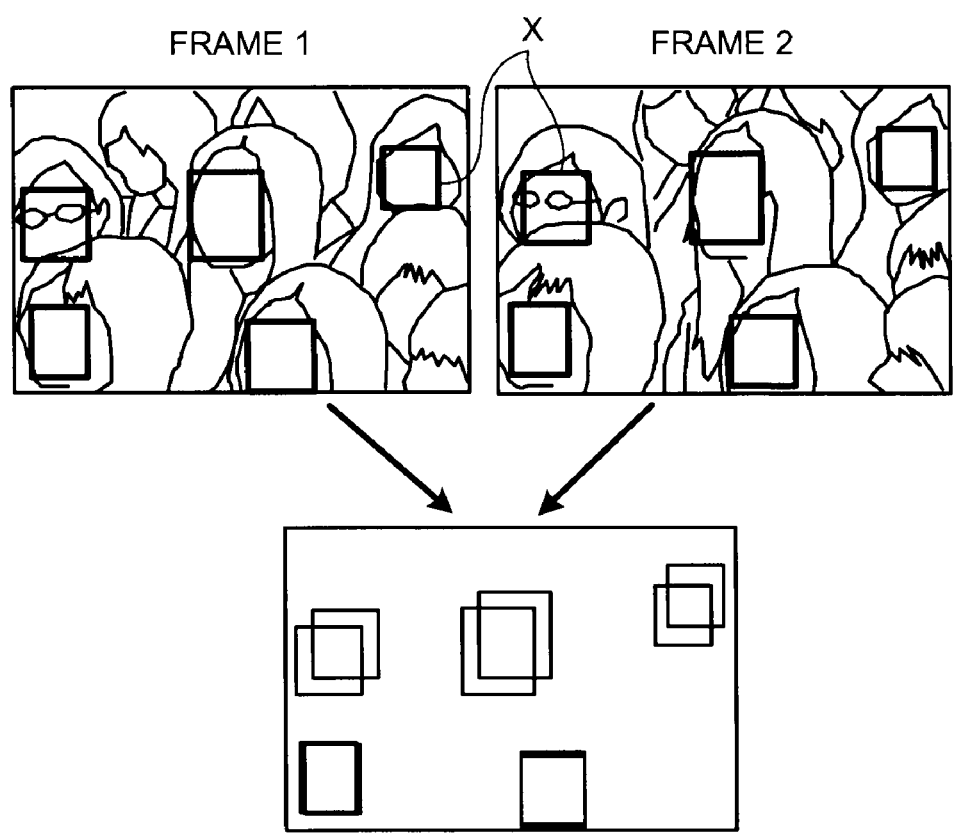
FIG. 14 is a schematic drawing illustrating yet another example of the method for determining a feature amount calculation area.

As yet another example, it is acceptable to perform the similar shot detection process by only using the group of coordinates of each of the face areas as a feature amount, without using the image feature amount calculated from the entire frame. For example, as shown in FIG. 14, in the case where an image of a plurality of people is taken in two mutually different shots, if it has been judged that, between the two frames, the position and the size of none of the images of the people have changed drastically in the very different direction (i.e., the change between the two corresponding face areas X is very small), it is acceptable to judge that these two frames have been taken by using mutually the same camera angle. In other words, it is acceptable to judge that the shots from which these two frames have respectively been extracted are similar shots.

The feature amount calculating unit 33 calculates a feature amount of each of the frames with respect to the area that is limited based on the decision made by the feature-amount calculation-area determining unit 32. Examples of the feature amount include an average value of the luminance levels or the colors of the pixels contained in the frame, a histogram thereof, and an optical flow (i.e., a motion vector) in the entire screen area or in a sub-area that is obtained by mechanically dividing the screen area into sections.

The feature amount comparing unit 34 compares the feature amounts between the two frames.

In the case where the feature amount comparing unit 34 has judged that the two frames are similar, the shot attribute assigning unit 35 assigns mutually the same shot attribute value (i.e., an ID) to each of the two shots from which the frames judged to be similar have respectively been extracted.

As explained above, according to the second embodiment, in the case where the difference in the feature amounts between the frames is within the predetermined error range, one or more target frames are selected from each of the shots, so that the feature amount of each of the target frames is calculated based on the face area within the target frame. In the case where the difference in the feature amounts between the target frames is within the predetermined error range, the shots from which the target frames judged to be similar have respectively extracted are determined to be similar shots to each of which mutually the same shot attribute value is assigned. As a result, when the two shots have been taken by using mutually the same camera angle, even if the people in the image have moved or the camera has zoomed in or out between the frames being compared with each other, it is possible to correctly detect the feature amounts of the target frames. Consequently, it is possible to improve the level of precision in the similar shot detection process. In addition, it is possible to improve the level of precision in a shot aggregating process that is performed based on the result of the similar shot detection process. Further, it is possible to improve the level of precision in an automatic dividing function included in a broadcast-program recording apparatus.

In the description of the second embodiment, the example in which the face attribute assigning unit 12 performs the functional operation has been explained. However, it is possible to achieve the advantageous effect described above in a restricted manner even if the face attribute assigning unit 12 does not perform the functional operation or the face attribute assigning unit 12 is not included in the picture processing apparatus 1. In the case where the face attribute assigning unit 12 is included in the picture processing apparatus 1 and performs the functional operation, when the frame selecting unit 31 selects two or more frames from each of the two shots and performs the similar shot detection process by using information of the plurality of pairs of frames, the level of precision is expected to improve because the face attribute assigning unit 12 brings the face areas that are judged to represent the face of mutually the same person into correspondence with each other between the shots and changes the weights used in the similarity level calculation process based on the face areas.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A picture processing apparatus comprising:
    a face area detecting unit that detects face areas each of which is an image area presumed to be a person's face, from frames constituting elements of a picture;
    a feature amount calculating unit that calculates a feature amount of each of the frames;
    a cut detecting unit that detects a cut point at which a screen image is switched to another screen image between the frames that are temporally successive, by using the feature amount;
    a face attribute assigning unit that assigns a mutually same face attribute value to each of the face areas, when groups of coordinates of the face areas between the temporally successive frames where the cut point is not present are within a predetermined error range;
    a similar shot detecting unit that, when a difference in the feature amounts between the frames is within a predetermined error range, selects two shots from which the frames have respectively been extracted and each of which is an aggregate of the frames within a time period obtained as a result of dividing at the cut point, and, when a difference in the feature amounts between a pair of one or more target frames selected from each of the two shots is within the predetermined error range, detects shots as similar shots to each of which a mutually same shot attribute value is assigned; and
    a face attribute re-assigning unit that assigns a mutually same face attribute value to each of the face areas, when the groups of coordinates of the face areas that respectively appear in the temporally successive frames contained in the similar shots and to which mutually different face attribute values have respectively been assigned are within the predetermined error range and the face areas having the different face attribute values are judged to be a face of a mutually same person.

2. The apparatus according to claim 1, wherein the difference in the feature amounts between the frames that is used by the similar shot detecting unit to detect the similar shots is a difference in the feature amounts between the frames calculated by the feature amount calculating unit.

3. The apparatus according to claim 1, wherein
    the similar shot detecting unit at least includes:
        a frame selecting unit that selects one or more target frames from each of two a feature amount calculating unit for detecting a similar shot that calculates a feature amount of each of the target frames based on the face areas within the target frames; and
        a feature amount comparing unit that compares the feature amounts between the target frames.

4. The apparatus according to claim 3, wherein the feature amount calculating unit for detecting a similar shot uses the group of coordinates of each of the face areas within the target frames as a part of the feature amount of a corresponding one of the target frames, and adds the group of coordinates to an image feature amount calculated from an entirety of the corresponding one of the target frames, thereby obtaining the feature amount.

5. The apparatus according to claim 3, wherein the feature amount calculating unit for detecting a similar shot uses the group of coordinates of each of the face areas within the target frames as the feature amount of the corresponding one of the target frames.

6. The apparatus according to claim 3, wherein
    the feature amount calculating unit for detecting a similar shot includes a feature-amount calculation-area determining unit that determines a feature amount calculation area within each of the target frames based on the face area, and
    the feature amount calculating unit for detecting a similar shot calculates the feature amount of each of the target frames from the feature amount calculation area.

7. The apparatus according to claim 6, wherein the feature-amount calculation-area determining unit specifies, as the feature amount calculation area, an enlarged area that is obtained by applying a predetermined multiplication factor to the group of coordinates of each of the face areas within the target frames serving as targets of the similarity judgment process.

8. The apparatus according to claim 6, wherein the feature-amount calculation-area determining unit generates person areas each of which is an image area presumed to be a person, based on the groups of coordinates of the face areas within the target frames serving as targets of the similarity judgment process, and specifies, as the feature amount calculation area, an area that remains after excluding an area obtained by combining the person areas from each of the target frames.

9. The apparatus according to claim 1, wherein the face attribute assigning unit judges that the frames contain no pair of face areas to which mutually the same face attribute value is to be assigned, when the cut point detected by the cut detecting unit is positioned between two of the frames as targets.

10. A computer program product having including a non-transitory computer readable medium including programmed instructions for processing pictures, wherein the instructions, when executed by a computer, cause the computer to perform:
    detecting face areas each of which is an image area presumed to be a person's face, from frames constituting elements of a picture;
    calculating a feature amount of each of the frames;

detecting a cut point at which a screen image is switched to another screen image between the frames that are temporally successive, by using the feature amount;

assigning a mutually same face attribute value to each of the face areas, when groups of coordinates of the face areas between the successive frames are within a predetermined error range;

selecting two shots from which the frames have respectively been extracted and each of which is an aggregate of the frames within a time period obtained as a result of dividing at the cut point when a difference in the feature amounts between the frames is within a predetermined error range;

detecting shots as similar shots to each of which a mutually same shot attribute value is assigned when a difference in the feature amounts between a pair of one or more target frames selected from each of the two shots is within the predetermined error range; and assigning a mutually same face attribute value to each of the face areas, when the groups of coordinates of the face areas that respectively appear in the temporally successive frames contained in the similar shots and to which mutually different face attribute values have respectively been assigned are within the predetermined error range and the face areas having the different face attribute values are judged to be a face of a mutually same person.

11. A picture processing method comprising:

detecting face areas each of which is an image area presumed to be a person's face, from frames constituting elements of a picture;

calculating a feature amount of each of the frames;

detecting a cut point at which a screen image is switched to another screen image between the frames that are temporally successive, by using the feature amount;

assigning a mutually same face attribute value to each of the face areas, when groups of coordinates of the face areas between the successive frames are within a predetermined error range;

selecting two shots from which the frames have respectively been extracted and each of which is an aggregate of the frames within a time period obtained as a result of dividing at the cut point when a difference in the feature amounts between the frames is within a predetermined error range;

detecting shots as similar shots to each of which a mutually same shot attribute value is assigned when a difference in the feature amounts between a pair of one or more target frames selected from each of the two shots is within the predetermined error range; and assigning a mutually same face attribute value to each of the face areas, when the groups of coordinates of the face areas that respectively appear in the temporally successive frames contained in the similar shots and to which mutually different face attribute values have respectively been assigned are within the predetermined error range and the face areas having the different face attribute values are judged to be a face of a mutually same person.

\* \* \* \* \*